United States Patent [19]
Blankenburg et al.

[11] Patent Number: 5,236,196
[45] Date of Patent: Aug. 17, 1993

[54] SPHERICAL BODY FORMED OF POLYGONAL MEMBERS

[76] Inventors: Karl Blankenburg, 32131 Claeys Dr., Warren, Mich. 48093; Karl V. Blankenburg, 61830 Lantern Cove, Washington, Mich. 48094

[21] Appl. No.: 801,458

[22] Filed: Dec. 2, 1991

[51] Int. Cl.⁵ ............... A63B 37/14; G09B 23/04
[52] U.S. Cl. ................. 273/58 D; 273/58 K; 434/213
[58] Field of Search ............ 273/58 R–58 BA, 273/58 D, 65 R, 65 E, 157 S, 58 K, 327, 428; 434/211, 213

[56] References Cited

U.S. PATENT DOCUMENTS

| | | | |
|---|---|---|---|
| D. 39,902 | 3/1909 | Marlow | D34/15 |
| D. 290,632 | 6/1987 | Dehnert et al. | D21/205 |
| 1,890,566 | 12/1932 | Bartky | 273/65 E |
| 2,257,252 | 9/1941 | Vorbusch | 273/58 A |
| 2,791,868 | 5/1957 | Viken | 273/58 D |
| 3,768,202 | 10/1973 | Wheelock | 273/58 D |
| 3,889,950 | 6/1975 | Kasravi | 273/58 D |
| 3,977,683 | 8/1976 | Tomura | 273/58 D |
| 4,050,184 | 9/1977 | Chiari | 446/111 |
| 4,274,222 | 6/1981 | Zahn et al. | 273/58 A |
| 4,701,131 | 10/1987 | Hildebrandt et al. | 434/211 |
| 4,717,158 | 1/1988 | Pennisi | 273/58 A |

FOREIGN PATENT DOCUMENTS

0481374 6/1928 Fed. Rep. of Germany ... 273/58 D

*Primary Examiner*—V. Millin
*Assistant Examiner*—Steven Wong
*Attorney, Agent, or Firm*—Basile and Hanlon

[57] ABSTRACT

A spherical body is formed of a plurality of polygonal-shaped members interconnected together at abutting side walls. Each polygonal member has an exterior surface disposed at a predetermined radius of curvature, with the exterior surfaces of the plurality of interconnected polygonal members forming the exterior surface of the spherical body when the members are joined together. In one embodiment, the polygonal members comprise pentagon-shaped members such that the spherical body is completely formed of identical, pentagon-shaped members. Various designs may be formed in the exterior surface of each polygonal member by use of raised and recessed portions in the exterior surface, as well as having certain portions of the exterior surface of each polygonal member devoid of material.

16 Claims, 5 Drawing Sheets

SPHERICAL BODY FORMED OF POLYGONAL MEMBERS

BACKGROUND OF THE INVENTION

1. Field of the Invention

The present invention relates, in general, to toys formed of a plurality of interconnected, substantially alike members.

2. Description of the Art

Geodesic-type toys have been formed of a plurality of substantially alike, individual elements which are interconnected to each other via interconnecting fittings, special joints or other fasteners to form a sphere or regular solid object. Such objects have been used for models, toys, and other applications, both useful or merely for purposes of aesthetic appeal.

It would be desirable to provide a novel spherical body useable as a toy which is constructed of a plurality of substantially identically shaped members. It would also be desirable to provide a spherical body which is formed of a plurality of substantially identical members which are easily interconnectible to form the desired spherical shape.

SUMMARY OF THE INVENTION

The present invention is a spherical body formed of a plurality of interconnected polygonal members. Each polygonal member has an outer surface of a predetermined arcuate shape. Each polygonal member also has peripheral side edges extending from and bounding the outer surface. Means are provided for joining abutting edges of a plurality of polygonal members together to form the spherical body.

The polygonal members may have any polygonal shape. When the polygonal members are formed as pentagons, the entire spherical body may be formed of identical polygonal-shaped members thereby requiring the use of only one mold to form all of the pentagon-shaped members.

The side edges of each polygonal member are formed as interconnected side wall segments which are joined together at opposite ends into a closed wall surrounding an interior cavity. The interior cavity may be completely or partially filled with solid material to form the exterior surface on each polygonal member. The top edges of the side wall segments and the exterior surface have the same arcuate shape or curvature.

The solid surface may be formed in a variety of configurations including multiple raised and recessed sections forming a particular design, such as a five-point star. Various cutouts may also be formed in the solid exterior surface to enhance the aesthetic appeal of the design.

In an alternate embodiment, radially inward extending ribs depend from the side wall segments and are joined at one end by additional lower side wall segments to form a cage-like structure for each polygonal member.

According to a preferred embodiment of the present invention, the side walls of each polygonal member are disposed at a predetermined angle which is identical for all of the polygonal members. The spherical body may be formed in any size by merely varying the radius of curvature or arc of each polygonal member. However, the angle of the side walls of each polygonal member remains the same with respect to the center point of the resulting sphere.

Each polygonal-shaped member may be joined to abutting polygonal members by a variety of means. Various welds, such as vibration, sonic, heat, etc., may be employed to fixedly join the polygonal members together. Alternately, separate fasteners may extend through aligned apertures formed in the side walls of the polygonal members to securely join the polygonal members together into the spherical body. The fasteners may comprise any conventional fastener, such as a one-time, non-separable fastener or releasable fasteners which may be removed to enable the spherical body to be assembled and disassembled as desired.

The spherical body of the present invention is constructed of a plurality of substantially alike polygonal-shaped members which enables the spherical body to be constructed with a low cost since only one or a few molds are necessary to form all of the polygonal-shaped members used to construct the spherical body.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
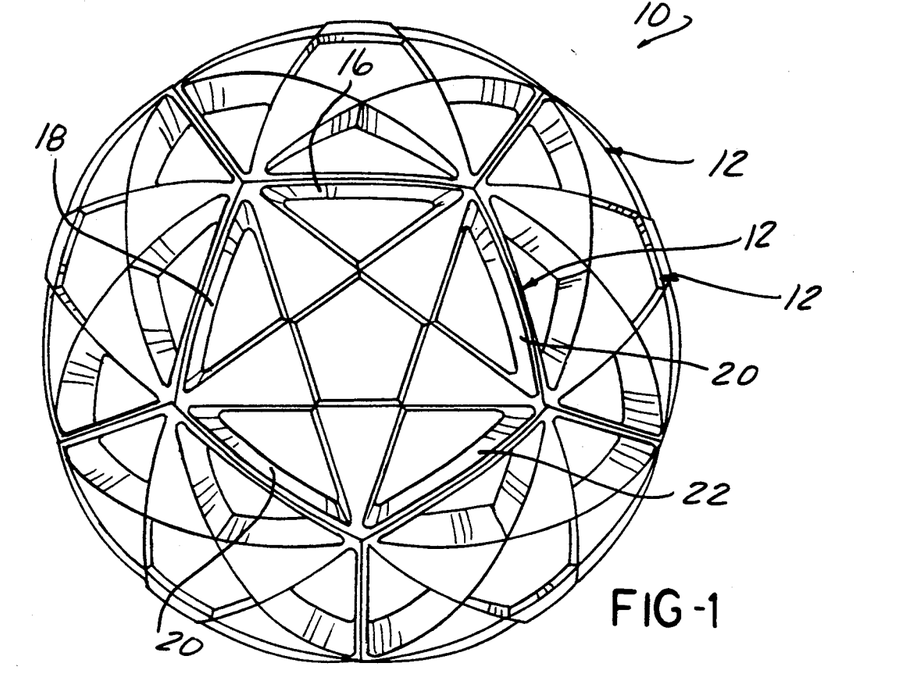
FIG. 1 is a pictorial view of one embodiment of the spherical body of the present invention.

Referring now to the drawing, and to FIG. 1 in particular, there is illustrated a spherical body 10 formed of a plurality of interconnected, substantially identical polygonal-shaped members. The spherical body 10 may be provided in any desired diameter. For example, an 18-inch diameter spherical body 10 may be constructed according to the principles of the present invention.

A plurality of members, such as members 12, are interconnected to form the spherical body 10. The members 12 may have any polygonal shape, such as a pentagon, hexagon, heptagon, octagon, nonagon, decagon, and dodecagon. In a preferred embodiment, the members 12 are formed as regular pentagons having equal length side wall segments as this configuration enables the entire spherical body 10 to be completely formed of identical pentagon-shaped members 12. In the 18-inch diameter example described above, the spherical body 10 may be formed of twelve identical pentagon-shaped members 12.

It will be noted that other polygonal-shaped members, as described hereafter, may also be employed to form the spherical body 10. Further, combinations of different polygonal-shaped members may also be employed to form the spherical body 10.

Figure 2:
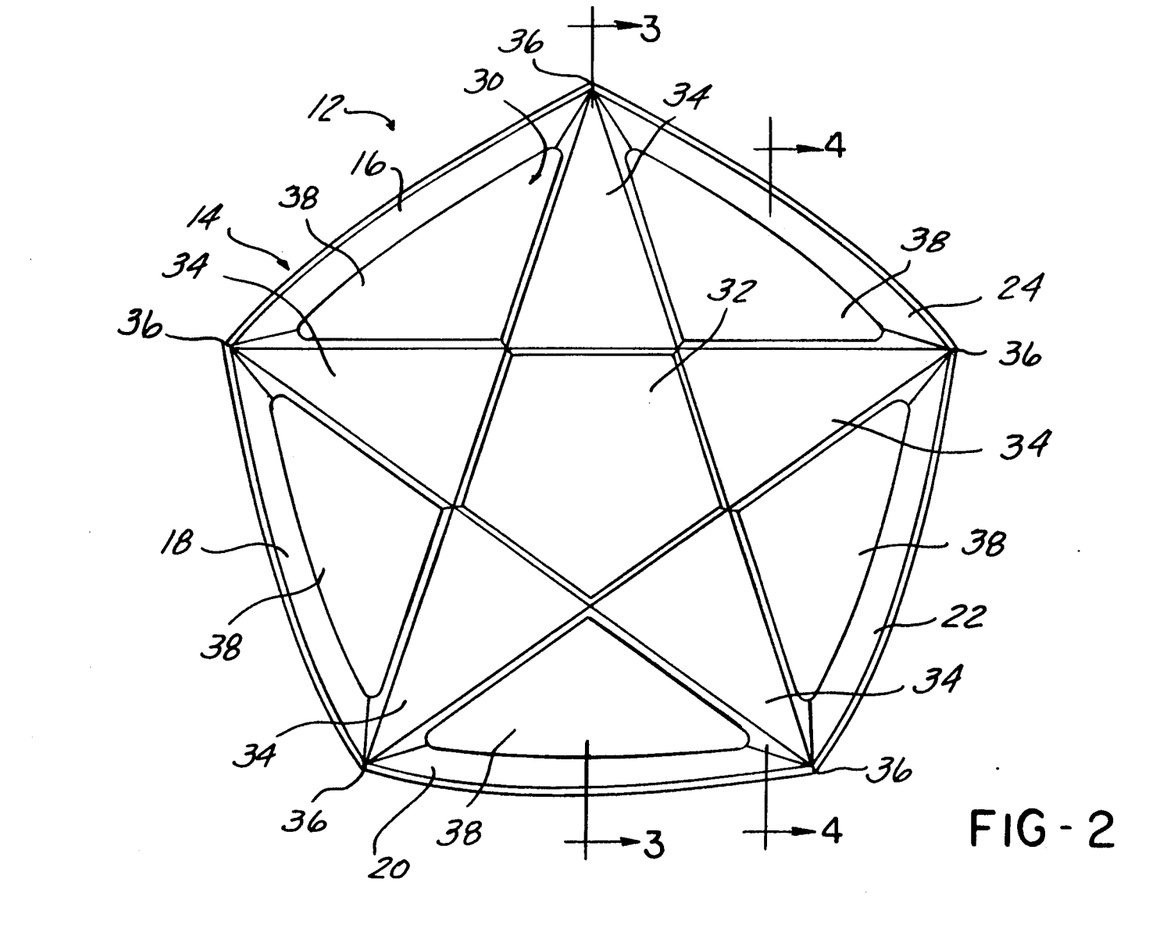
FIG. 2 is a plan view of one of the identical polygonal members employed in the spherical body shown in FIG. 1.
Figure 3:
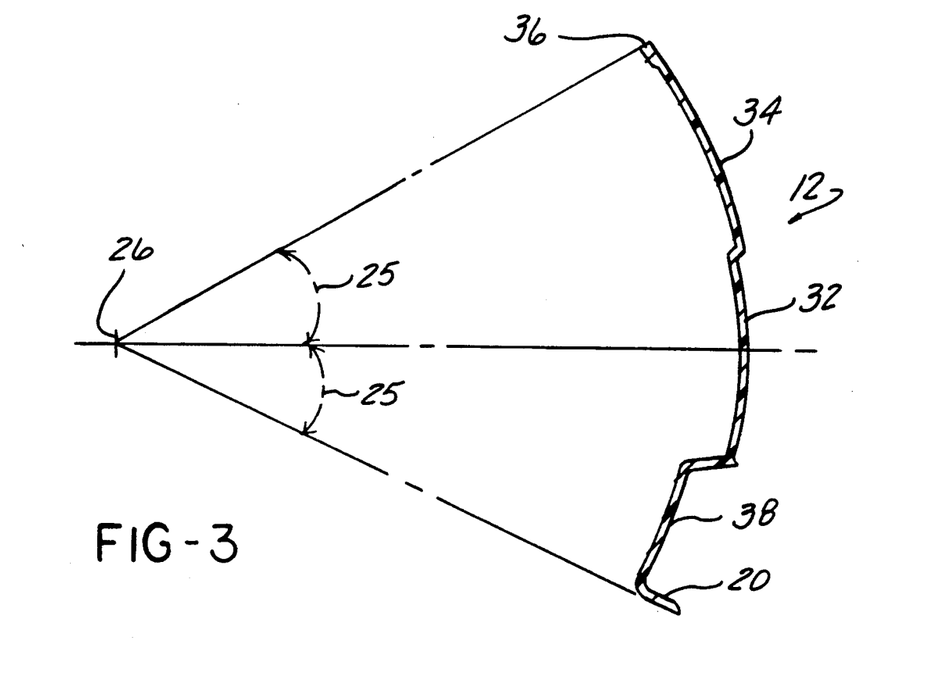
FIG. 3 is a cross sectional view generally taken along line 3—3 in FIG. 2.
Figure 4:
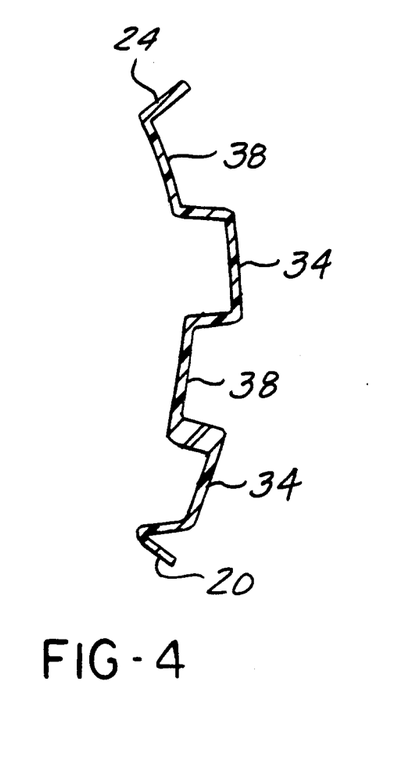
FIG. 4 is a cross sectional view generally taken along line 4—4 in FIG. 2.

As shown in FIGS. 2, 3 and 4, each member 12 is formed with a side edge denoted in general by reference number 14. For the pentagonal-shaped member 12 of the preferred embodiment of the present invention, the side edge 14 is formed of interconnected side wall segments 16, 18, 20, 22 and 24. The side wall segments 16, 18, 20, 22 and 24 have a generally thin, strip-like shape of a predetermined width and depth. Due to the regular polygonal shape of the member 12, each of the side wall segments 16, 18, 20, 22, and 24 has the same length.

Although each member 12 may be formed of any suitable material and by any conventional technique, preferably, each member 12 is formed of a molded plastic, as described hereafter. In this manner, the side wall segments 16, 18, 20, 22 and 24 are integrally formed as a unitary body joined at each end to adjacent side wall segments.

Referring briefly to FIG. 3, each of the side wall segments 16, 18, 20, 22 and 24 is disposed at a predetermined angle 25 with respect to the center 26 of the spherical body 10 which is formed when a plurality of members 12 are interconnected as described hereafter. The angle of each side wall segment with respect to the center of the resultant spherical body 10 is identical. This enables a plurality of identical pentagon-shaped members 12 to be interconnected at abutting side edges to form the spherical body 10. In the present example, the angle of each side wall segment with respect to the center of the spherical body 10 is 31°43′3″.

The side wall 14 of each member 12 surrounds and forms an interior cavity. In the embodiment shown in FIGS. 1–4, the interior cavity denoted by reference number 30 is a generally solid surface which is interconnected at peripheral edges to the side wall 14. In the case of molded plastic, the solid portions of the interior cavity 30 are integrally and unitarily joined to the side wall 14. It should be noted that the exterior surface formed in the cavity 30 is disposed at the same arc or radius of curvature from the center of the spherical body 10 as are the top edges of the side wall 14.

The surface 30 of the interior cavity may be formed in any shape, or in any particular design, or with no design at all, i.e., void of material. By way of example only, the exterior surface of the interior cavity 30 hereafter denoted as the surface 30, of each member 12 is formed in a five-point star with raised and recessed sections. Thus, the star design includes a pentagon-shaped center portion 32, five generally triangular legs 34 which extend outward from the center portion 32 and terminate in a pointed apex 36 disposed at a corner between two abutting side wall segments. Boundary portions denoted by reference number 38 are disposed between each of the legs 34 of the star design and one of the side wall segments 16, 18, 20, 22 and 24.

Although the star design may be formed by simply imprinting the design on a solid, arcuate-shaped exterior surface 30 of each member 12, for greater aesthetic appeal, the star design is formed by raised and recessed portions formed in the exterior surface 30 of each member 12.

By way of example only, the five legs 34 of the star design are disposed at a first raised arcuate surface substantially coincident with the top edge of the side wall segments 16, 18, 20, 22 and 24. The center portion 32 of the star design is recessed a first distance below the top surface of the legs 34. The boundary portions 38 are recessed a second, further distance from the top surface of the legs 34 below the top surface of the center portion 32. This creates a three-dimensional appearance for each member 12 which enhances the appeal of the spherical body 10 since this three-dimensional design is repeated in each polygonal member 12 forming the spherical body 10.

It will be understood that the raised and recessed portions of the star design described above may be varied such that the center portion 32 may comprise the highest-most surface of the design, with the legs 34 being the lowermost recessed surface in the exterior surface 30 of each member 12.

As a variation on the solid exterior surface 30 of the member 12, some or all of the various portions 32, 34 and 38 may be cut out and devoid of material. For example, some or combinations of two of the center portion 32, the legs 34 and the boundary portions 38 of the star design may be devoid of material, with the remaining portions being solid. Thus, only the center portion 32 may be devoid of material with the legs 34 and the boundary portions 38 formed as solid surfaces at different heights with respect to the top of the side edge 14. Alternately, the center portion 32 and some or all of the boundary portions 38 may be devoid of material, with the legs 34 being formed of solid material. Conversely, the center portion 32 and the boundary portions 38 may be solid, with some or all of the legs 34 being devoid of material. The solid portions of each of such designs are interconnected at their ends to adjacent solid portions to form a rigid structure in the exterior surface 30 of each member 12.

Figure 6:
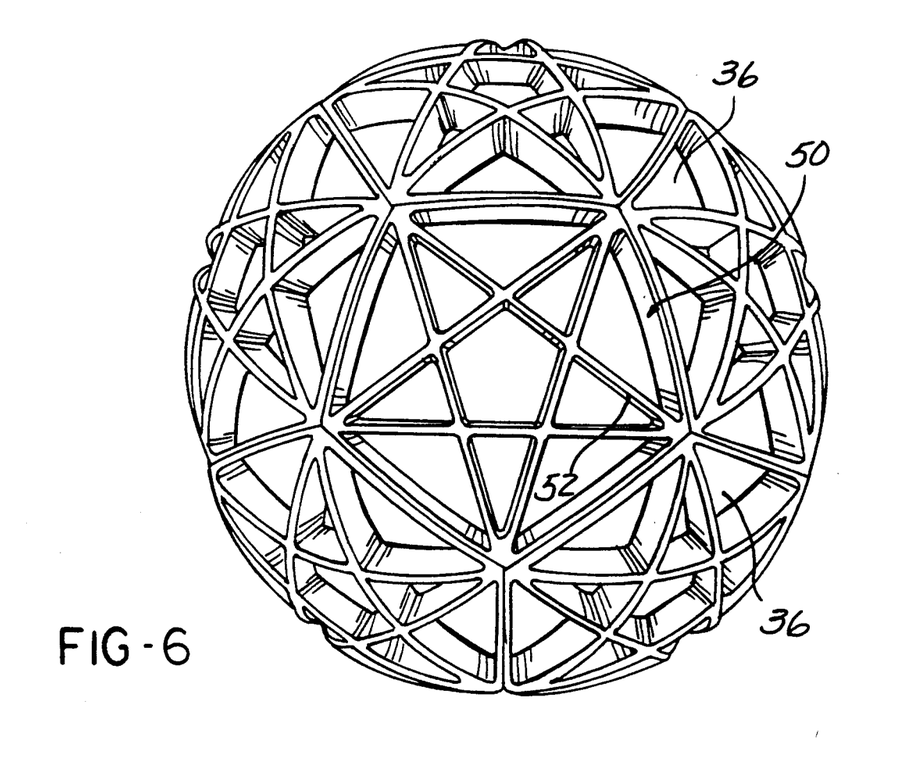
FIG. 6 is a pictorial view of a polygonal member having another interior design.

The star design may also be formed as a skeletal arrangement of interconnected ribs as shown in FIG. 6. In this embodiment, each pentagon-shaped member 50, a plurality of which are used to form a spherical body, includes a plurality of thin ribs all denoted in general by reference number 52 which extend from the side edges 36 of each member 50 to adjacent edges 36 or to intermediate portions of other ribs 52. When the member 50 is formed of a molded plastic, the ribs 52 are integrally joined to the side walls 36 and to other ribs 52 of each member 50. As with the embodiment shown in FIG. 1 and described above, the ribs 52 and the side walls of each member 50 are disposed at a predetermined radius of curvature, with the side walls being disposed the same angle with respect to the center of the spherical body 10 as described above.

Further, in the embodiment shown in FIG. 6, the center, legs and boundary portions of the star design are cut out or devoid of material. When a plurality of like members 50 are interconnected to form the spherical body, a unique three-dimensional appearance is created since the members 50 form only the exterior shell or surface of the spherical body, with the interior of the spherical body being empty or hollow.

Further, as with the embodiment shown in FIG. 2, any of the center, legs or boundary portions of the star design, in between the ribs 52, may be formed as a solid surface continuous with the top surface of the ribs 52 and the side walls of each member 50.

Figure 7:
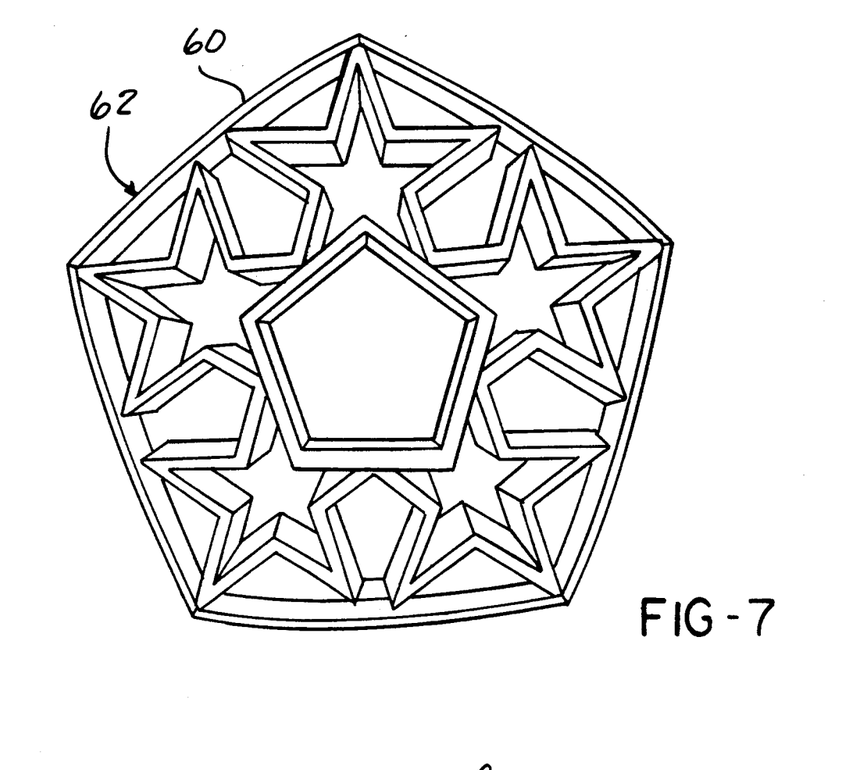
FIG. 7 is a pictorial view of a polygonal member having yet another interior design.

FIG. 7 depicts another embodiment of a pentagon-shaped member 60 which has a side wall 62 formed as substantially described above and shown in FIG. 1. The internal structure forming the exterior surface of the member 60 is formed of a plurality of star-shaped members which are integrally connected at adjoining ends and side edges to each other, to a centrally located, pentagon-shaped element and to the side walls of each member 60. Although the center portions and the portions between each of the star designs are shown in FIG. 7 as being devoid of material, some or all of these portions may also be filled with solid material to provide variations on the appearance of a spherical body formed of a plurality of identical members 60.

To further enhance the aesthetic appeal of the spherical body 10 of the present invention, the polygon members, such as members 12, 50 or 60 in each of the embodiments described above, may be formed in a variety of distinct colors. In this manner, the spherical body may be formed of a plurality of different colored polygonal members. Alternately, two or more colors may be employed to provide a design or alternating color appearance for the spherical body.

In all embodiments of the spherical body 10 of the present invention, the plurality of polygonal members, such as the polygonal members 12, are interconnected at their side walls to abutting members 12 by any one of a number of suitable means. For a rigid, non-separable spherical body construction, any suitable plastic welding technique, such as heat welding, vibration welding, sonic welding, etc., may be employed to fixedly join the sidewalls 14 of the members 12 into the spherical body 10. When the body 10 is joined by such techniques, the side wall segments 16, 18, etc., do not have to open to the interior of each member 12. Rather, the adjacent portions of the interior cavity of each member 12 may be flush with each side wall segment.

Figure 5:
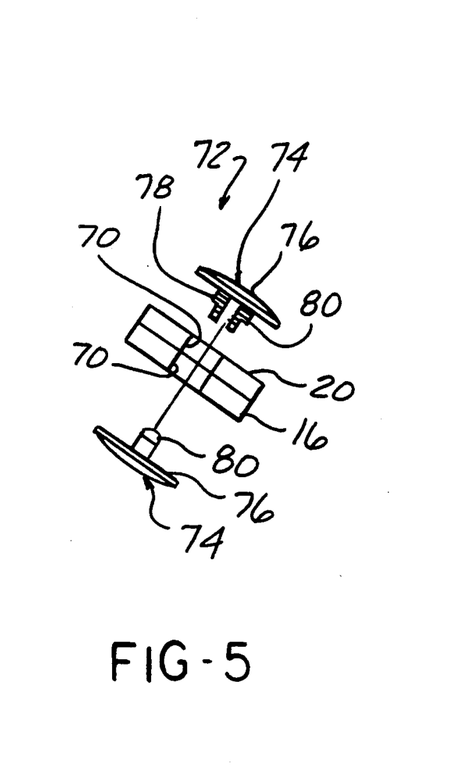
FIG. 5 is a partial, exploded view showing one example of a fastener which may be employed to join abutting polygonal members together.

Alternately, the plurality of polygonal members 12 may be interconnected by means of fasteners for a separable or a fixed, non-separable construction. FIG. 5 depicts a typical fastener 72 which may be employed to join abutting side walls, such as side wall segments 16 and 20, of two abutting polygonal members 12 together. In using this or any fastener, at least one and preferably two or more apertures 70 are formed in each of the side wall segments 16, 18, 20, 22 and 24 of each member 12. The side walls of two members 12 are abutted with each other such that the apertures 70 are aligned therebetween. The fasteners 72 may be inserted therethrough and locked or clamped together to securely lock the two members 12 together. Other members 12 are then joined to the two joined members to complete the spherical body 10.

The fastener 72 shown in FIG. 5, which is depicted by way of example only, comprises a two-part fastener formed of identical members 74 which can be non-separably interconnected to each other. Each of the members 74 includes an enlarged, substantially planar head 76 and a pair of legs 78 and 80 which are spaced apart and extend outward from one surface of the head 76. The legs 78 and 80 of each of the fasteners 74 engage the corresponding legs 78 and 80 of the other fastener member 74, with one of the fastener members 74 being rotated 90° with respect to the other fastener member 74. The legs 78 and 80 of the two members 74 are inserted through the aligned apertures 70 in the abutting side walls of two members 12 and interlocked to securely retain the two members 12 together.

Other types of separable fasteners, such as nuts and bolts, may also be employed to enable the spherical body 10 to be repeatedly assembled and disassembled. The separable fasteners would enable the spherical body 10 to be disassembled and the individual members rearranged into a different pattern, particularly if each of the polygonal members has a different color and/or design in the exterior surface thereof.

Figure 8:
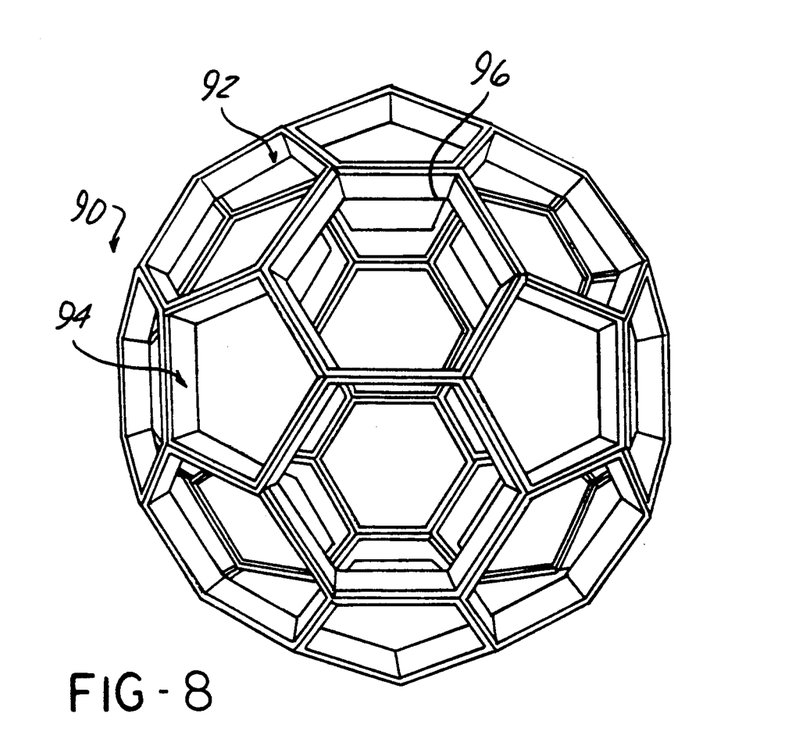
FIG. 8 is a pictorial view of another embodiment of the spherical body of the present invention.

Another embodiment of the present invention is shown in FIG. 8. In this embodiment, a spherical body 90 is formed of a first group of polygonal members 92 which have a generally hexagonal configuration. Certain spaces between interconnected hexagonal members 90 are filled by pentagon-shaped members 94. The members 92 and 94 are interconnected together by welding or fasteners, as described above.

The shape of the exterior surface of each of the members 92 and 94 may be any of the shapes described above and shown in the preceding figures. In addition, the exterior surface of certain of the members 92 and 94, such as that of the members 92, for example, may be completely devoid of material as shown in FIG. 8 or filled with a solid material as shown for the members 94.

Some or all of the bodies 92 and 94 may have an internal structure formed of depending ribs which extend from the side walls of the bodies 92 and 94 into the interior of the spherical body 90 when the members 92 and 94 are interconnected together. While the rib structure could extend over the entire radius of the spherical body 90 from the exterior layer to the center of the body 90 in an inwardly tapering pyramidal form, it is preferred that the ribs extend only a short distance from the exterior surface of each of the bodies 92 and 94.

Figure 9:
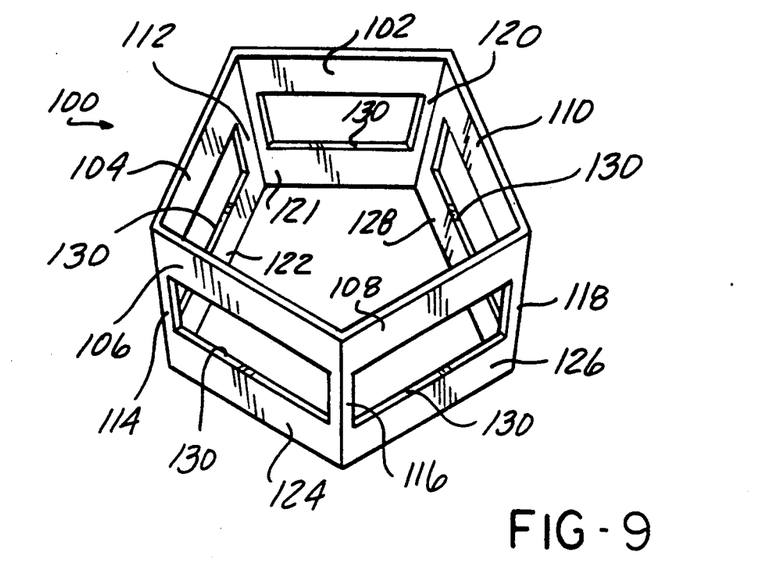
FIG. 9 is a perspective view of one of the polygonal members of the spherical body shown in FIG. 8.

FIG. 9 depicts a member 100 which is identical in shape to the bodies 94 shown in FIG. 8. However, the body 100 has an internal rib structure extending radially inward toward the center of the spherical body 90 and is devoid of material at its exterior surface.

As shown in FIG. 9, the pentagon-shaped member 100 includes a plurality of upper side wall segments 102, 104, 106, 108 and 110 which are substantially identical in shape, arrangement and construction as the side wall segments 16, 18, 20, 22 and 24 for the member 12 shown in FIG. 2 and described above. The upper side wall segments 102, 104, 106, 108 and 110 are disposed at the same inwardly extending angle as described above and shown in FIG. 3.

A plurality of depending ribs 112, 114, 116, 118 and 120 extend radially inward from the juncture of two upper side wall segments toward the radial center of the spherical body 90 at the same angle described above and shown in FIG. 3. Thus, rib 112 is disposed between and extends radially inward from the juncture of upper side wall segments 102 and 104. The remaining ribs 114, 116, 118 and 120 likewise extend radially inward from the juncture of two of the other upper wall segments 104, 106, 108, 110 and 102. The length of the ribs 112, 114, 116, 118 and 120 is provided in any desired amount. Preferably, however, the length of each of the ribs 112, 114, 116, 118 and 120 is relatively short length; although each of the ribs could extend completely from the upper wall segments to the center of the spherical body 90.

A plurality of lower wall segments 121, 122, 124, 126 and 128 are interconnected between the radially inward ends of each of the ribs 112, 114, 116, 118 and 120. The lower wall segments are spaced from a corresponding one of the upper wall segments. The surface between each pair of upper and lower wall segments may be solid or, as shown in FIG. 9, open in the form of an aperture 130.

The surface bounded by the upper wall segments 102, 104, 106, 108 and 110 in this embodiment may be solid and have any of the designs described above and shown in the other figures of the drawing. The surface may also have the rib-like skeletal arrangement described above and shown in FIG. 6. Preferably, however, the surface bounded by the upper wall segments is devoid of material thereby exposing the inner rib structure including the ribs and lower wall segments. The space bounded by the lower wall segments 121, 122, 124, 126 and 128 may also be provided in a solid form with or without a design, a skeletal rib-like structure arranged in a selected design, or completely devoid of material as shown in FIG. 9.

The above-described rib structure may also be provided on the hexagonal-shaped members 92 shown in the body 90 in FIG. 8.

Due to the angular arrangement of the side wall segments and the depending ribs, the lower side wall segments have a smaller overall cross section than the cross section formed by the upper side wall segments.

Figure 10:
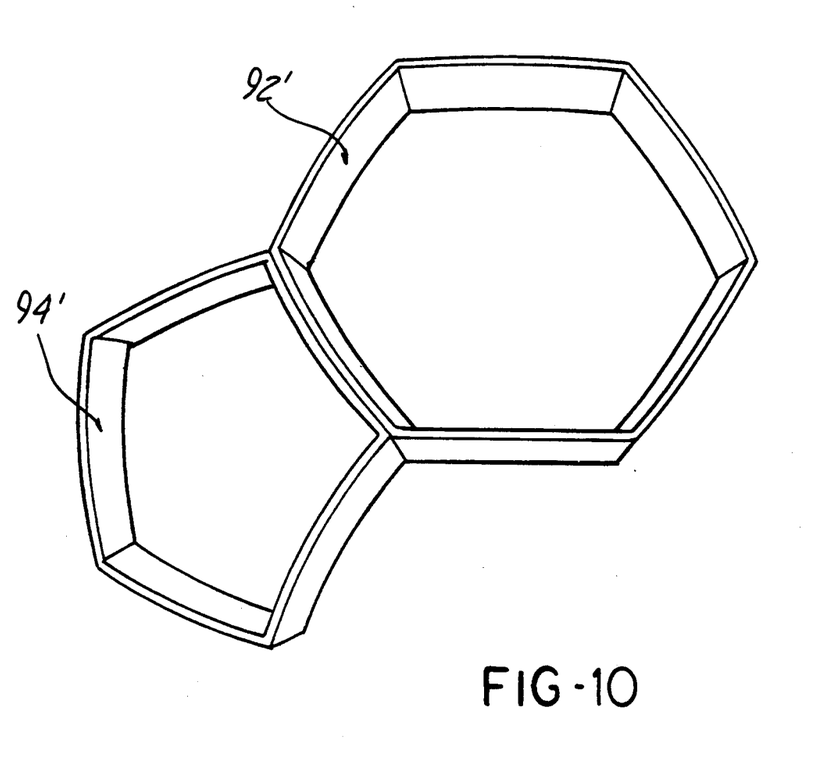
FIG. 10 is a pictorial view of yet another embodiment of the spherical body of the present invention.

The side walls of the members 92 and 94 may have a planar, substantially straight configuration as shown in FIG. 8. Alternately, as shown in FIG. 10, the side walls of the members 92' and 94' may have a generally curved or arcuate shape between the ends of each sidewall segment.

In all of the above-described embodiments of the spherical body of the present invention, each polygonal member may be formed of any of a variety of different materials. Preferably, however, each polygonal member is formed of a molded plastic, such as, for example, a low density polyethylene. The formulation of the plastic material may be selected to make each polygonal member rigid or semi-rigid or slightly resilient. Various foamed plastics with or without a resilient outer skin may also be employed.

In summary, there has been disclosed a novel spherical body which is formed of a plurality of interconnected polygon-shaped members. The polygon-shaped members may take the form of any regular polygon, such as a pentagon, hexagon, etc. When pentagon-shaped members are employed, the spherical body may be constructed of a plurality of identical pentagon-shaped members. The polygon members may have various designs formed in the exterior surface thereof and may be provided in the same or different colors for different aesthetic appearances.

What is claimed is:

1. A spherical body comprising:
   a plurality of substantially rigid polygonal members;
   each polygonal member having an outer surface disposed at a predetermined radius of curvature;
   each polygonal member having a peripheral side wall depending angularly from and bounding the outer surface, the side wall being formed of a plurality of segments interconnected at opposite ends into a closed wall surrounding an interior cavity, each segment having an upper edge coextensive with the outer surface of each polygonal member and a lower edge spaced from the upper edge; and
   means for joining abutting segments of the side walls of a plurality of polygonal members together into a sphere in which the outer surfaces of the joined polygonal members extend over and form the entire surface of the sphere.

2. The spherical body of claim 1 wherein the polygonal members are identical in plan shape.

3. The spherical body of claim 2 wherein the polygonal members have a pentagon shape.

4. The spherical body of claim 1 wherein the interior cavity is formed as a solid surface between the segments of the side wall of each polygonal member.

5. The spherical body of claim 4 wherein the solid surface has raised and recessed sections formed therein in a predetermined design.

6. The spherical body of claim 1 wherein the joining means comprises welds.

7. The spherical body of claim 1 wherein the joining means comprises:
   apertures formed in the side wall of each polygonal member; and
   fastener means extendible through aligned apertures in abutting segments of the side walls of adjacent polygonal members for joining abutting polygonal members together.

8. The spherical body of claim 7 wherein the fastener means comprises non-separable fasteners.

9. The spherical body of claim 1 wherein the segments of the side wall are linear.

10. The spherical body of claim 1 wherein the segments of the side wall are arcuate.

11. The spherical body of claim 1 wherein:
    the side wall segments of each polygonal member are disposed at identical predetermined angles with respect to a predetermined center line through each polygonal member such that the plurality of polygonal members form a sphere when arranged in an abutting side wall configuration.

12. The spherical body of claim 1 wherein each polygonal member is formed of a molded plastic.

13. A spherical body comprising:
    a plurality of substantially rigid polygonal members;
    each polygonal member having an outer surface disposed at a predetermined radius of curvature;
    each polygonal member having a peripheral side wall extending angularly from and bounding the outer surface, the side wall being formed of a plurality of segments interconnected at opposite ends into a closed wall surrounding an interior cavity, the interior cavity defining the outer surface of each polygonal member;
    a plurality of thin ribs joined to and extending from the segments of the side walls and interconnected with the segments of other side walls and other ribs through the interior cavity into a predetermined design; and
    means for joining abutting segments of the side walls of a plurality of polygonal members together into a sphere in which the outer surfaces of the joined polygonal members extend over the entire surface of the sphere.

14. A spherical body comprising:
    a plurality of substantially rigid polygonal members;
    each polygonal member having an outer surface disposed at a predetermined radius of curvature;
    each polygonal member having a peripheral side wall extending angularly from and bounding the outer surface, the side wall being formed of a plurality of segments interconnected at opposite ends into a closed wall surrounding an interior cavity, the interior cavity defining the outer surface of each polygonal member; and means for joining abutting segments of the side walls of a plurality of polygonal members together into a sphere in which the outer surfaces of the joined polygonal members extend over the entire surface of the sphere;

each polygonal member further including:

another side wall formed of a plurality of segments interconnected at opposite ends into a closed wall surrounding another interior cavity, the another side wall being spaced from the side wall bounding the outer surface of each polygonal member; and a plurality of ribs extending between and interconnecting at least certain of the segments of the side wall bounding the outer surface and certain of the segments of the another side wall in a cage-like structure.

15. The spherical body of claim 14 wherein:

each pair of spaced segments of the side wall and the another side wall are disposed at a predetermined angle with respect to a center line through the interior cavity of the side wall, a line extending through each pair of spaced segments of the side wall and the another side wall intersecting the center of a sphere when a plurality of like polygonal members are interconnected into a sphere.

16. A spherical body comprising:

a plurality of substantially rigid polygonal members;

each polygonal member having an outer surface disposed at a predetermined radius of curvature;

each polygonal member having a peripheral side wall depending angularly from and bounding the outer surface, the side wall being formed of a plurality of segments interconnected at opposite ends into a closed wall surrounding an interior cavity;

each segment of the side wall having an upper edge co-extensive with the outer surface of the polygonal member and a lower edge spaced from the upper edge;

a solid surface formed in the interior cavity between the segments of the side wall of each polygonal member;

recesses formed in the solid surface adjacent the segments of the side wall of each polygonal member exposing an inner surface of each segment of the side wall in the interior cavity; and means for joining abutting segments of the side walls of a plurality of polygonal members together into a sphere in which the outer surfaces of the joined polygonal members extend over the entire surface of the sphere.

* * * * *